(12) United States Patent
Korb et al.

(10) Patent No.: US 7,073,992 B2
(45) Date of Patent: Jul. 11, 2006

(54) ARBOR FOR HOLE CUTTER AND RELATED METHOD OF USE

(75) Inventors: William B. Korb, Melrose, CT (US); Charles M. O'Keefe, Monson, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 10/875,092

(22) Filed: Jun. 23, 2004

(65) Prior Publication Data
US 2005/0025591 A1     Feb. 3, 2005

Related U.S. Application Data

(60) Provisional application No. 60/482,170, filed on Jun. 24, 2003.

(51) Int. Cl.
*B23B 51/04* (2006.01)
(52) U.S. Cl. .................................. 408/204; 408/239 R
(58) Field of Classification Search ................ 408/204, 408/206, 207, 209, 703, 239 R, 239 A
See application file for complete search history.

(56) References Cited

U.S. PATENT DOCUMENTS

| 2,779,361 A | 1/1957 | McKiff |
| 3,390,596 A * | 7/1968 | Trevathan .................... 408/68 |
| 3,758,221 A | 9/1973 | Meshulam |
| 3,784,316 A | 1/1974 | Bittern |
| 3,837,759 A | 9/1974 | Bittern |
| 3,880,546 A | 4/1975 | Segal |
| 3,929,343 A | 12/1975 | Wanner et al. |

(Continued)

FOREIGN PATENT DOCUMENTS

EP     1 066 902 A2     1/2001

(Continued)

OTHER PUBLICATIONS

International Search Report of International Application No. PCT/US04/20402 Filing Date Jun. 24, 2004 report dated Apr. 6, 2005.

(Continued)

*Primary Examiner*—Daniel W. Howell
(74) *Attorney, Agent, or Firm*—McCarter & English, LLP (57) ABSTRACT

An arbor is provided for a hole cutter having an outer surface defining a threaded hole, and a pair of pin holes spaced radially relative to the threaded hole. The arbor has an arbor body defining a threaded end portion threadedly engageable with the threaded hole of the hole cutter, a stop surface formed adjacent to the threaded end portion and spaced radially outwardly therefrom; a drive shank located on another end portion of the arbor body; and a pair of first bearing surfaces located on opposite sides of the arbor body relative to each other and extending axially along a portion of the arbor body between the stop surface and drive shank. A pin ring has an aperture formed therethrough for slidably receiving the arbor body; a pair of drive pins; a second bearing surface that is abuttingly engageable with the hole cutter with the pins received within the corresponding pin holes of the hole cutter; and a pair of third bearing surfaces that are engageable with the first bearing surfaces of the arbor body for preventing relative rotation of the pin support member and arbor body, and are movable axially over the stop surface of the arbor body and engageable with the major diameter of the threaded end portion of the arbor body.

32 Claims, 6 Drawing Sheets

U.S. PATENT DOCUMENTS

| | | |
|---|---|---|
| 3,973,862 A | 8/1976 | Segal |
| 4,036,560 A | 7/1977 | Clark et al. |
| 4,101,238 A | 7/1978 | Reibetanz et al. |
| 4,107,949 A | 8/1978 | Wanner et al. |
| 4,148,593 A | 4/1979 | Clark |
| 4,274,642 A | 6/1981 | Wunsch |
| 4,303,357 A | 12/1981 | Makar |
| 4,407,615 A | 10/1983 | Kuhlmann |
| 4,491,443 A | 1/1985 | DeCaro |
| 4,502,824 A | 3/1985 | Dohse et al. |
| 4,626,152 A | 12/1986 | Palm |
| 4,669,928 A | 6/1987 | Mediavilla |
| 5,061,126 A | 10/1991 | Cain et al. |
| 5,074,722 A | 12/1991 | Cochran |
| 5,108,235 A | 4/1992 | Czyzewski |
| 5,154,552 A | 10/1992 | Koetsch |
| 5,161,334 A | 11/1992 | Schaal et al. |
| 5,167,475 A | 12/1992 | Miyanaga |
| 5,174,588 A | 12/1992 | Reibetanz et al. |
| 5,226,762 A | 7/1993 | Ecker |
| 5,246,317 A | 9/1993 | Koetsch et al. |
| 5,352,071 A | 10/1994 | Cochran et al. |
| 5,427,482 A | 6/1995 | Asano et al. |
| 5,597,274 A * | 1/1997 | Behner ..................... 408/204 |
| 5,658,102 A | 8/1997 | Gale |
| 5,813,802 A | 9/1998 | Ajimi et al. |
| 5,868,532 A | 2/1999 | Spenser |
| 5,954,347 A | 9/1999 | Buck et al. |
| 5,967,709 A | 10/1999 | Thuesen |
| 6,092,814 A | 7/2000 | Kageler |
| 6,120,221 A * | 9/2000 | Alm ..................... 408/204 |
| 6,158,320 A | 12/2000 | Vallance et al. |
| 6,179,300 B1 | 1/2001 | Baumann et al. |
| 6,250,856 B1 | 6/2001 | Miyanaga |
| 6,357,973 B1 | 3/2002 | Chao |
| 6,379,089 B1 | 4/2002 | Sugiura et al. |
| 6,536,780 B1 | 3/2003 | Baumann et al. |
| 6,623,220 B1 | 9/2003 | Nuss et al. |
| 6,701,629 B1 | 3/2004 | Krondorfer et al. |
| 6,705,807 B1 | 3/2004 | Rudolph et al. |
| 2001/0025899 A1 | 10/2001 | Bradshaw et al. |
| 2002/0028117 A1 | 3/2002 | Nuss et al. |
| 2002/0083807 A1 | 7/2002 | Gascoyne |
| 2002/0122703 A1 | 9/2002 | Czyzewski et al. |

FOREIGN PATENT DOCUMENTS

| | | | |
|---|---|---|---|
| GB | 2035156 A | | 6/1980 |
| GB | 2059309 A | | 4/1981 |
| GB | 2257381 | * | 1/1993 |
| GB | 2275886 A | | 9/1994 |
| GB | 2295110 | * | 5/1996 |
| GB | 2 332 195 A | | 6/1999 |
| WO | 97/15413 | * | 5/1997 |
| WO | WO 03/024677 A1 | | 3/2003 |
| WO | 2004/011179 | * | 2/2004 |

OTHER PUBLICATIONS

Written Opinion of International Application No. PCT/US04/20402, Filing Date Jun. 24, 2004 Written Opinion dated Apr. 6, 2005.

* cited by examiner

ARBOR FOR HOLE CUTTER AND RELATED METHOD OF USE

CROSS-REFERENCE TO RELATED APPLICATION

This application claims priority to U.S. Provisional Application No. 60/482,170 filed on Jun. 24, 2003, titled "Arbor for Hole Cutter and Related Method of Use", and is hereby expressly incorporated by reference as part of the present disclosure.

FIELD OF THE INVENTION

The present invention relates to arbors and methods of using arbors, and more particularly, to arbors and methods of using arbors for hole saws and other hole cutters that prevent off axis wobble of the hole saws relative to the arbors.

BACKGROUND INFORMATION

A typical arbor for a hole saw or other hole cutter includes an arbor body defining a threaded end portion that is threadedly engageable within the end plate of a hole saw to fixedly secure the hole saw to the arbor. A pilot drill is receivable within the threaded end portion of the arbor body and extends through the center of the hole saw. The arbor body defines a shoulder that is axially spaced adjacent to the threaded end portion and is engageable with the end plate of the hole saw. The arbor further includes a pin ring that is axially spaced from the threaded end portion and fixedly secured to the arbor body by a set screw. A drive plate is slidably mounted on the arbor body on the opposite side of the pin ring relative to the threaded end portion, and includes a pair of diametrically opposed drive pins that extend into corresponding through holes formed in the pin ring. The ends of the drive pins are received in corresponding drive holes formed in the end plate of the hole saw to rotatably drive the hole saw. A lock nut is threadedly mounted on the arbor body on the opposite side of the drive plate relative to the pin ring.

In order to mount the hole saw to the arbor, the end plate of the hole saw is threaded onto the threaded end portion of the arbor body until the end plate contacts the shoulder of the arbor body. The end plate is then unthreaded or backed away from the shoulder just enough to align the drive holes in the hole saw with the drive pins of the arbor. Then, the lock nut is threadedly engaged with the drive plate to, in turn, lock the drive plate to the pin ring and secure the arbor to the hole saw.

One of the drawbacks associated with this type of arbor is that when the hole saw is backed away from the shoulder to align the drive pins with the drive holes of the saw, a gap is formed between the end plate of the saw and the pin ring of the arbor. This gap can lead to off-axis wobble of the hole saw, particularly with larger diameter hole saws and/or hole saws that operate at relatively high rotational speeds. Off-axis wobble can cause undesirable vibration of the hole saw during cutting that can reduce the cutting life of the hole saw and/or create a degree of inaccuracy in the cut that is greater than otherwise desired.

Accordingly, it is an object of the present invention to overcome one or more of the above-described drawbacks and/or disadvantages of the prior art.

SUMMARY OF THE INVENTION

The present invention is directed to an arbor for a hole cutter including an outer surface defining a threaded hole, and at least one pin hole spaced radially relative to the threaded hole. The arbor comprises an axially-elongated arbor body including a first threaded portion formed on an end portion of the arbor body and defining a major thread diameter that is threadedly engageable with the threaded hole of the hole cutter. A shoulder of the arbor body is formed adjacent to the first threaded portion and spaced radially outwardly therefrom, and a second threaded portion is axially spaced on another side of the shoulder relative to the first threaded portion. A drive shank is formed on end portion of the arbor body opposite the first threaded portion. The arbor body also defines at least one first bearing surface extending axially along a portion of the arbor body between the shoulder and drive shank.

The arbor further includes a pin ring defining an aperture extending therethrough, an axial bearing surface formed on one side of the pin ring, and at least one, and preferably two, drive pins radially spaced relative to the aperture and extending axially from the axial bearing surface. A second bearing surface of the pin ring forms at least a portion of a periphery of the aperture. The arbor body is receivable within the aperture of the pin ring with at least one of the pin ring and arbor body being axially movable relative to the other, and at least one of the first and second bearing surfaces being engageable with the other for preventing the pin ring and arbor body from rotating relative to each other. The drive pins are receivable within the pin holes of the hole cutter, and at least one of the second and axial bearing surfaces is movable axially over the shoulder of the arbor body and is engageable with the major diameter of the first threaded portion of the arbor body. As a result, the axial bearing surface of the pin ring is abuttingly engageable with the hole cutter when the drive pins are received within corresponding pin holes to thereby eliminate any gap that otherwise might exist between the pin ring and hole saw. A locking member of the arbor is threadedly engageable with the second threaded portion of the arbor body for releasably securing the axial bearing surface of the pin ring in abutting engagement with the hole cutter.

The present invention also is directed to a method for attaching an arbor to a hole cutter. The hole cutter comprises an outer surface defining a threaded hole, and at least one drive pin hole spaced radially relative to the threaded hole. The arbor comprises an arbor body including a threaded end portion, and a stop surface formed adjacent to the threaded end portion and spaced radially outwardly therefrom. A pin support member of the arbor includes an aperture formed therethrough, a second bearing surface formed on one side thereof, at least one pin extending outwardly of the second bearing surface, and a third bearing surface formed adjacent to the aperture. At least one of the second and third bearing surfaces, and preferably both, are axially movable over the stop surface of the arbor body and engageable with the threaded end portion thereof. A locking member is coupled to the arbor body to secure the pin ring in abutting engagement with the hole saw. The method comprises the following steps:

(i) threadedly connecting the end portion of the arbor body to the threaded hole of the hole cutter until the hole cutter contacts the stop surface of the arbor body;

(ii) unthreading the end portion of the arbor body from the threaded hole of the hole cutter and aligning the at least one pin of the pin support member with the at least one corresponding pin hole of the hole cutter;

(iii) moving the pin support member axially over the arbor body and toward the hole cutter until the at least one pin of the pin support member is received within the at least one corresponding pin hole of the pin hole cutter and the third bearing surface abuttingly engages the hole cutter; and (iv) moving the locking member axially over the arbor body and toward the pin support member and releasably securing with the locking member the second bearing surface of the pin support member in abutting engagement with the hole saw.

One advantage of the present invention is that the axial bearing surface of the pin ring abuttingly engages the hole cutter and thereby eliminates any gap therebetween that otherwise would cause off-axis wobble.

Other objects, advantages and features of the present invention will become more readily apparent in view of the following detailed description of the currently preferred embodiment and accompanying drawings.

DETAILED DESCRIPTION OF THE PREFERRED EMBODIMENTS

In FIGS. 1–8, an arbor embodying the present invention is indicated generally by the reference numeral 10. The arbors of the present invention are usable with hole cutters, such as hole saws and sheet metal hole cutters. The term "hole cutter" is used herein to mean any of numerous different type of cutting tools for cutting holes in work pieces, such as hole saws, sheet metal hole cutters, etc. The term "arbor" is used herein to mean any of numerous different types of devices for supporting a rotating tool, such as a hole cutter, on a power tool such as a drill, and further includes, without limitation, mandrels. In FIGS. 5–10, the illustrated hole cutters are sheet metal hole cutters of the type disclosed in co-pending U.S. utility patent application Ser. No. 10/869,267, entitled "SHEET METAL HOLE CUTTER", filed on Jun. 16, 2004 in the name of William B. Korb, which is assigned to the Assignee of the present invention and is hereby expressly incorporated by reference as part of the present disclosure. As shown, for example, in FIGS. 5 and 6, a typical hole cutter 12 includes an end wall 14 defining a threaded hole 16 extending through a central portion of the end wall, and a pair of diametrically opposed pin holes 18 radially spaced relative to the central threaded hole 16. A blade 20 extends axially from the end wall 14 and defines a plurality of cutting teeth 22 for cutting a hole in a work piece by rotatably driving the arbor 10 and hole cutter 12 and moving the rotatably-driven cutting teeth into the work piece.

Figure 3A:
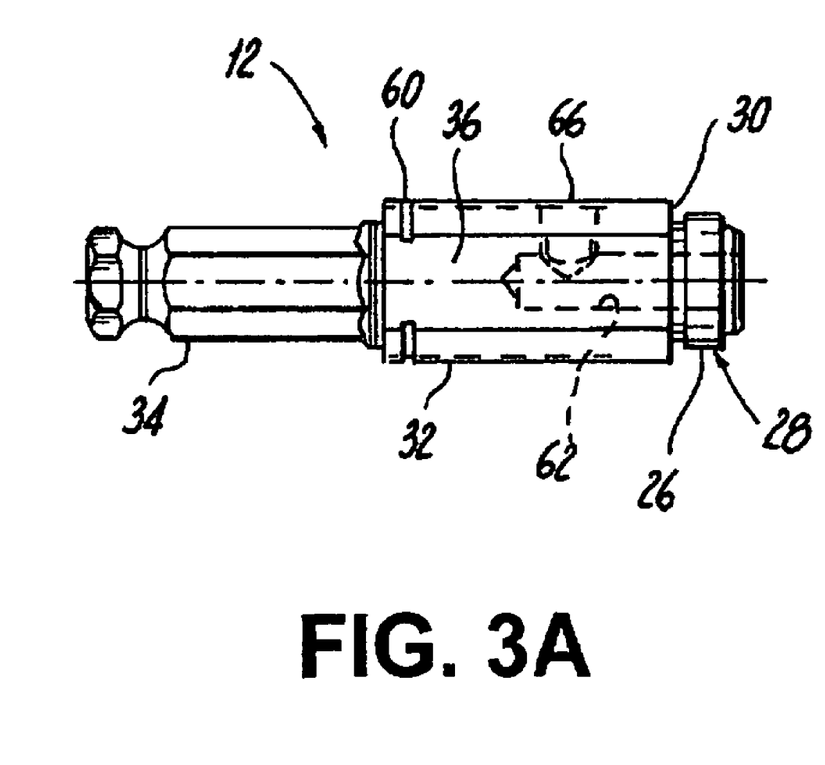
FIG. 3A is a side elevational view of the arbor body of the arbor of FIG. 1.
Figure 3B:
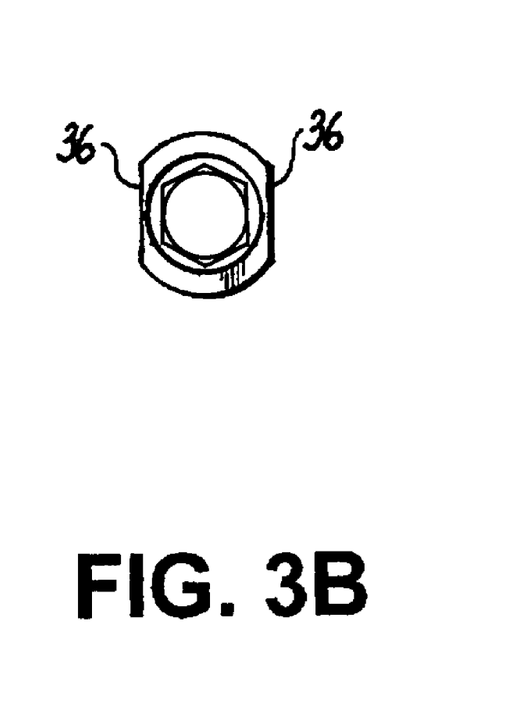
FIG. 3B is an end elevational view of the arbor body of the arbor of FIG. 1.
Figure 4:
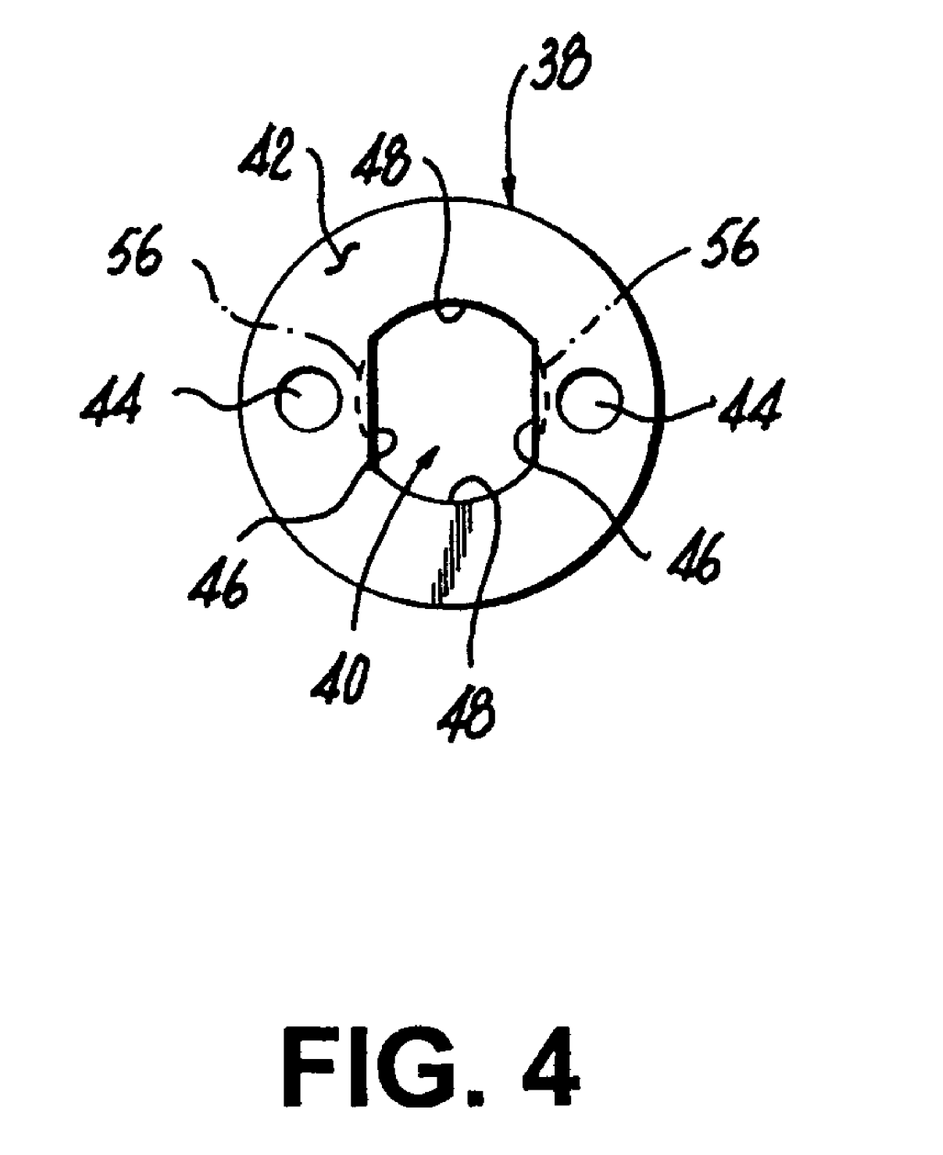
FIG. 4 is an end elevational view of the pin ring of the arbor of FIG. 1.
Figures 5, 6:
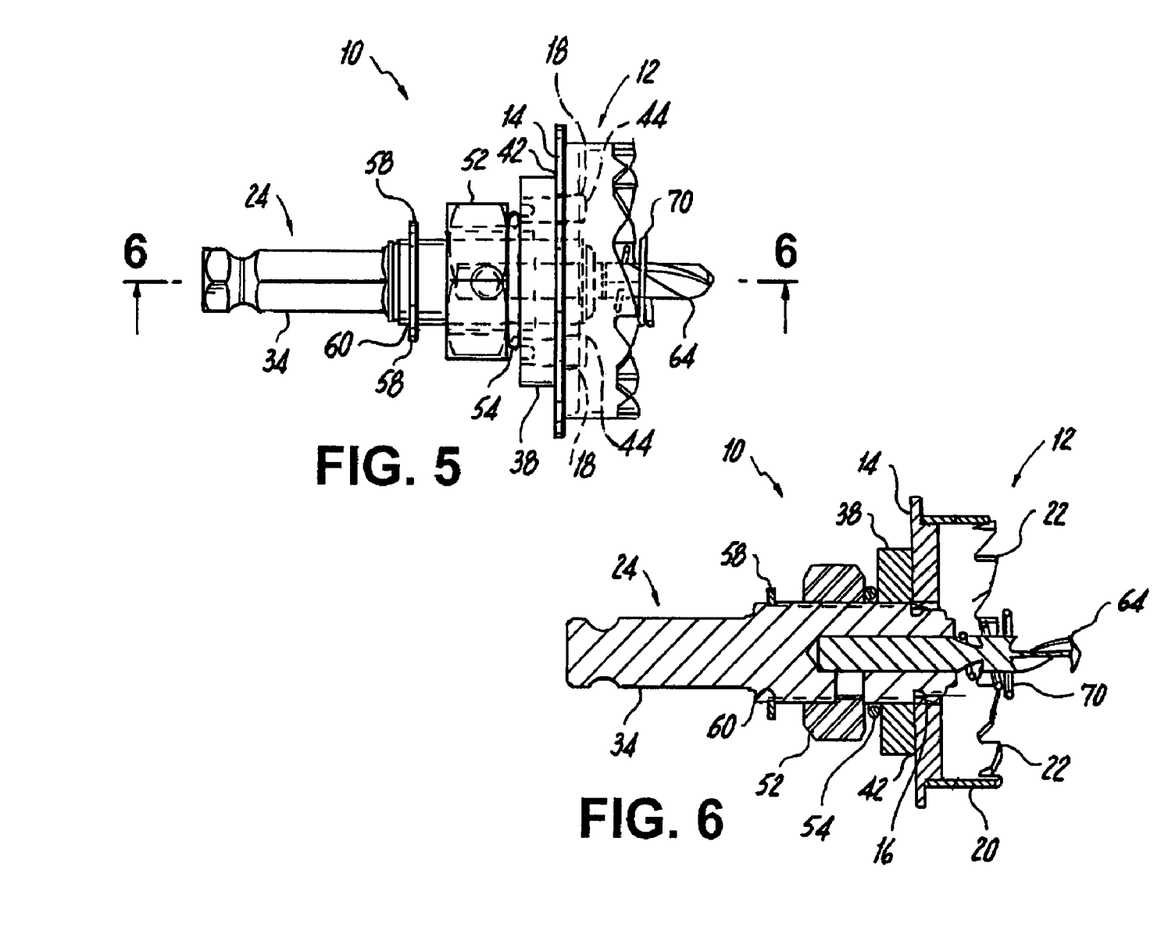
FIG. 5 is a side elevational view of the arbor of FIG. 1 including a sheet metal hole cutter mounted thereto.
FIG. 6 is a cross-sectional view of the arbor and sheet metal hole cutter of FIG. 5 taken along line 6—6 of FIG. 5.

As shown in FIGS. 1–4, the arbor 10 comprises an axially-elongated arbor body 24 including a first threaded portion 26 formed on an end portion of the arbor body, and defining a major thread diameter 28 that is threadedly engageable with the threaded hole 16 of the hole cutter 12 (FIG. 6). A shoulder or stop surface 30 is formed adjacent to the first threaded portion 26 and spaced radially outwardly therefrom. A second threaded portion 32 is axially spaced on another side of the shoulder 30 relative to the first threaded portion 26. A drive shank 34 is formed on another end portion of the arbor body 12. A pair of first bearing surfaces 36 are formed on opposite sides of the arbor body 24 relative to each other, and extend axially along a substantial portion of the arbor body between the shoulder 30 and drive shank 34. In the illustrated embodiment of the present invention, the drive shank 34 is a quick-release power drive shank of a type known to those of ordinary skill in the pertinent art. However, as may be recognized by those of ordinary skill in the pertinent art based on the teachings herein, the shank 34 may take the form of any of numerous different types of shanks or other structures that are currently or later become known for performing the function of the shank 34 disclosed herein.

The arbor 10 further includes a pin ring 38 defining an aperture 40 extending therethrough for slidably receiving the arbor body 24. As shown best in FIG. 4, an axial bearing surface 42 is formed on one side of the pin ring 38, and a pair of drive pins 44 are radially spaced relative to the aperture 40 and extend axially from the axial bearing surface 42. The pin ring 38 further defines a pair of second bearing surfaces 46 forming opposing peripheral portions of the aperture 40. The second bearing surfaces 46 slidably engage the corresponding first bearing surfaces 36 of the arbor body 24 to prevent relative rotation of the arbor body and pin ring.

A pair of curvilinear surfaces 48 are formed on opposite sides of the aperture 40 relative to each other, and extend between the ends of the opposing second bearing surfaces 46. The curvilinear surfaces 48 are spaced in close proximity to the second threaded portion 32 of the arbor body, but not in contact therewith, to permit sliding movement of the pin ring over the second threaded portion of the arbor body. As can be seen, the opposing bearing surfaces 46 and curvilinear surfaces 48 form a "double D" configuration. However, as may be recognized by those of ordinary skill in the pertinent art based on the teachings herein, this configuration is only exemplary, and numerous other shapes and/or configurations that are currently or later become known equally may be used.

Figure 1:
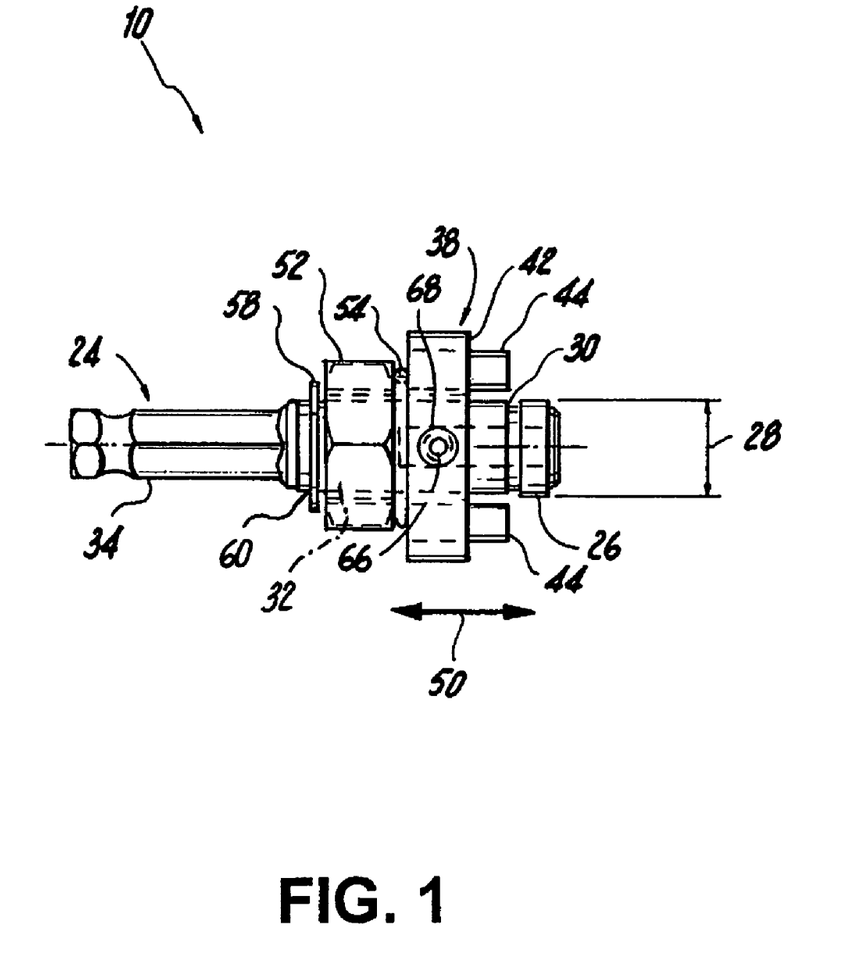
FIG. 1 is a side elevational view of an arbor embodying the present invention.
Figure 2:
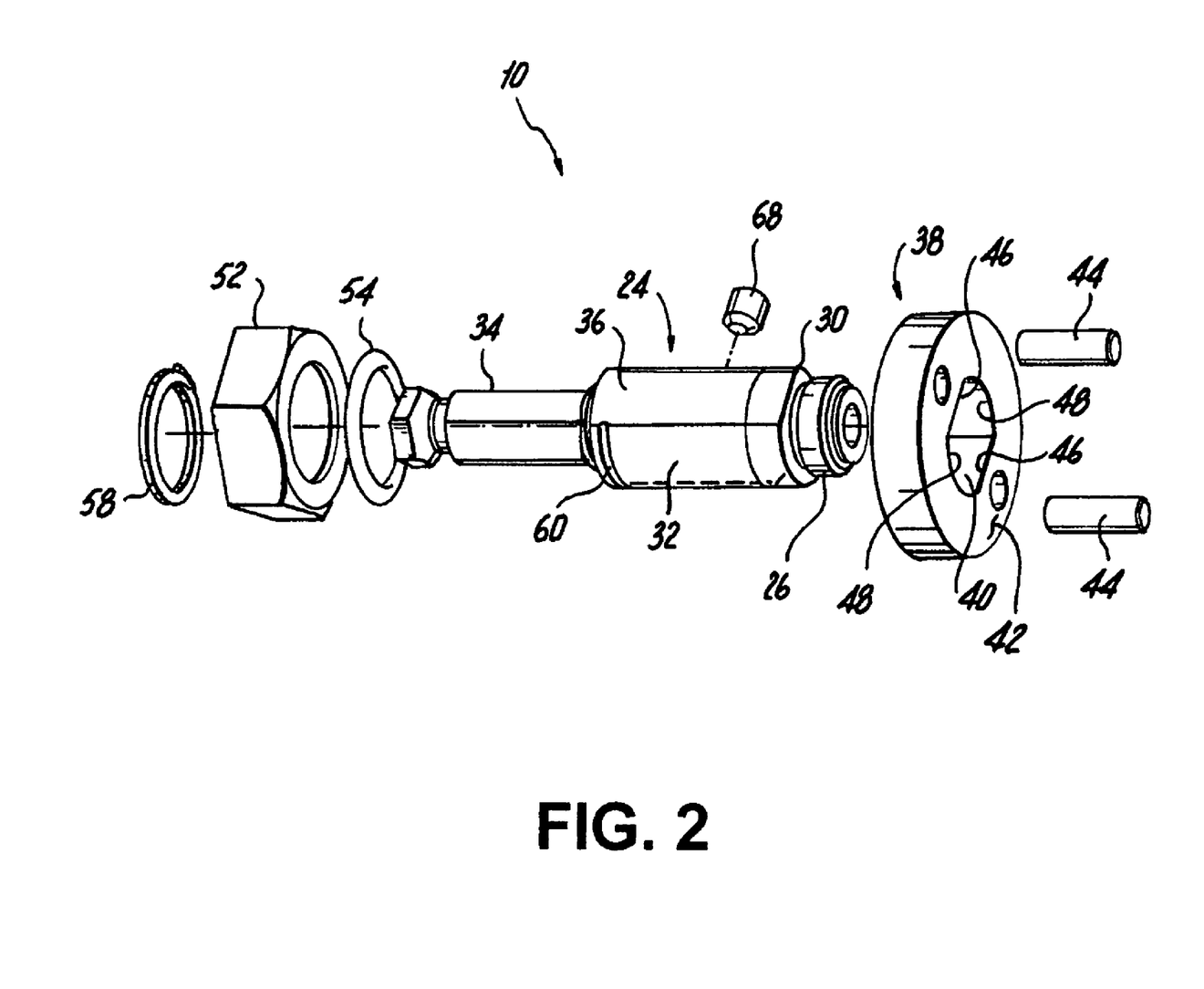
FIG. 2 is an exploded perspective view of the arbor of FIG. 1.

As shown in FIG. 1, the arbor body 24 is receivable within the aperture 40 of the pin ring 38, and as indicated by the arrow 50 in FIG. 1, the pin ring and arbor body are movable axially relative to each other; however, the first and second bearing surfaces 36 and 46, respectively, slidably engage each other for preventing the pin ring and arbor body from rotating relative to each other. As shown in FIGS. 5 and 6, the drive pins 44 of the pin ring 38 are receivable within the corresponding pin holes 18 of the hole cutter 12. The axial bearing surface 42 of the pin ring 38 and forward edges of the second bearing surfaces 46 are movable axially over the shoulder 30 of the arbor body 24 and are engageable with the major diameter 28 of the first threaded portion 26 of the arbor body. As a result, and as described further below, the axial bearing surface 42 of the pin ring 38 is abuttingly engageable with the end wall 14 of the hole cutter 12 with the drive pins 44 of the pin ring 38 received within the corresponding pin holes 18 of the hole cutter.

As shown in FIG. 1, the arbor 10 further includes a locking member 52 threadedly engageable with the second threaded portion 32 of the arbor body 24 for releasably securing the axial bearing surface 42 of the pin ring 38 in abutting engagement with the hole cutter 12. A resilient member 54 is receivable on the arbor body 24 between the locking member 52 and pin ring 38 to facilitate securing the locking member and pin ring to the hole cutter. In the illustrated embodiment of the present invention, the locking member 52 is in the form of a threaded nut, and the resilient member 54 is in the form of an elastomeric o-ring. The resilient member 54 facilitates allowing the locking member 52 to be tightened by hand to releasably, but fixedly secure the pin ring in abutting engagement with the hole cutter, and to subsequently release by hand the locking member. Accordingly, the resilient member 54 enables, if desired, a tool-less, "quick change" arbor. As may be recognized by those of ordinary skill in the pertinent art based on the teachings herein, however, the particular locking member and resilient member illustrated herein are only exemplary, and numerous other types of locking members, such as numerous different types of fasteners, and numerous other types of resilient members, or other types of structures to facilitate maintaining the locking member in a locked position, that are currently or later become known for performing the functions of either or both of these components, equally may be used.

If desired, and as shown in broken lines in FIG. 4, each second bearing surface 46 may define a chamfered edge 56 that is engageable with the first threaded portion 26 of the arbor body 24.

The arbor 10 further comprises a retaining clip 58 connectable to, for example, a groove 60 (FIG. 2) formed in the arbor body 24 at one end of the second threaded portion 32 for engaging the locking member 52 and preventing further axial movement thereof. In the illustrated embodiment, the clip 58 is a c-clip; however, as may be recognized by those of ordinary skill in the pertinent art based on the teachings herein, the retaining clip may take the form of any of numerous different types of clips, fasteners or other structures that are currently, or later become known for performing the function of the retaining clip disclosed herein.

As shown in phantom in FIG. 3, the arbor body 24 further defines a pilot drill aperture 62 spaced radially inwardly relative to the first threaded portion 26 of the arbor body for receiving a pilot drill 64 (FIGS. 5 and 6), and a fastener aperture 66 extending radially through a side wall of the arbor body. As shown in FIG. 1, the arbor 10 further includes a fastener 68 receivable within the fastener aperture 66 and engageable with the pilot drill 64 received within the pilot drill aperture 62 for fixedly securing the pilot drill to the arbor body. The pin ring 38 is axially movable relative to the fastener 68 received within the fastener aperture 66. In the illustrated embodiment, the fastener 68 is a set screw; however, as may be recognized by those of ordinary skill in the pertinent art based on the teachings herein, the fastener may take the form of any of numerous other types of fasteners that are currently, or later become known for performing the function of the fastener described herein.

In the operation of the arbor 10, the first threaded portion 26 of the arbor body 24 is threadedly connected to the threaded hole 16 of the hole cutter 12 until the end wall 14 of the hole cutter contacts the stop surface 30 of the arbor body. The first threaded portion 26 of the arbor body 24 is then unthreaded or "backed away" from the threaded hole 16 of the hole cutter 12 just enough to align, or until the drive pins 44 of the pin ring 38 are aligned with, the corresponding pin holes 18 of the hole cutter 12. The pin ring 38 is then moved axially over the arbor body 24 and toward the hole cutter 12 until the drive pins 44 of the pin ring 38 are received within the pin holes 18 of the hole cutter 12, and the axial bearing surface 42 of the pin ring 38 abuttingly engages the end wall 14 of the hole cutter. The locking member 52 is then rotated to move axially over the arbor body 24 and toward the pin support member 38, and is tightened against the resilient member 54 to releasably, but fixedly secure the axial bearing surface 42 of the pin ring in abutting engagement with the end wall 14 of the hole saw 12.

As shown in FIGS. 5 and 6, the pilot drill 64 is fixedly secured to the arbor body 24 in the manner described above, and a slug-release spring 70 is mounted over the base of the pilot drill and releasably secured to the threaded end portion 26 of the arbor body to facilitate in releasing work piece scrap and/or slugs from the hole cutter.

Figure 7:
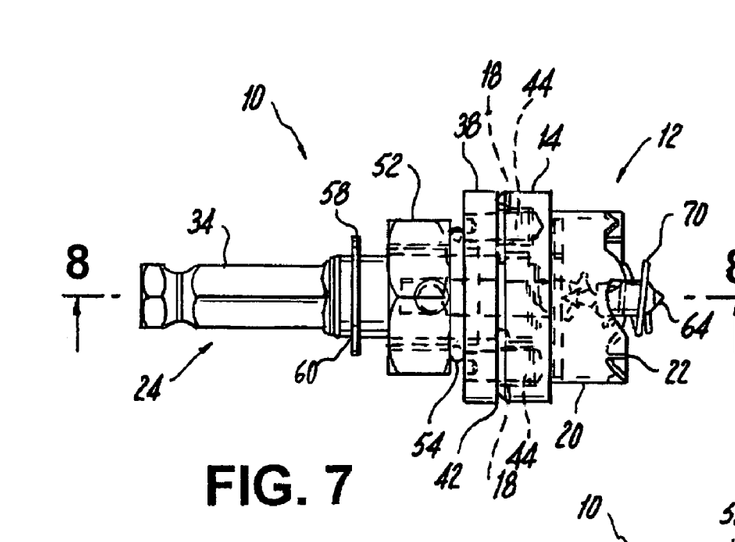
FIG. 7 is a side elevational view of the arbor of FIG. 1 mounted to a sheet metal hole cutter having a different cutting diameter than the sheet metal hole cutter of FIGS. 5 and 6.
Figure 8:
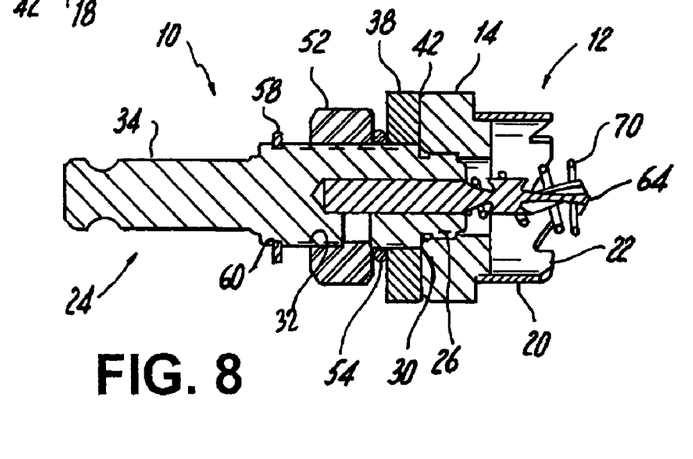
FIG. 8 is a cross-sectional view of the arbor and sheet metal hole cutter of FIG. 7 taken along line 8—8 of FIG. 7.

As shown in FIGS. 7 and 8, the arbor 10 is usable with any of numerous different types and/or sizes of hole cutters. As can be seen, the hole cutters 12 shown in FIGS. 7 and 8 have a smaller cutting diameter than the hole cutters illustrated in FIGS. 5 and 6. However, by providing such different sized hole cutters with the same hole patterns in their end walls 14, they can each be used with the same arbor 10.

One advantage of the present invention is that because the axial bearing surface 42 and edges of the second bearing surfaces 46 of the pin ring are moveable axially over the stop surface 30 of the arbor body, and are engageable with the major diameter 28 of the first threaded portion 26 of the arbor body, the axial bearing surface 42 of the pin ring can abuttingly engage the end wall 14 of the hole cutter 12 in the locked position. As a result, the gap formed between the pin ring and the end wall of the hole cutter encountered in prior art arbors is eliminated, and the arbor of the present invention can operate substantially without off-axis wobble. Yet another advantage of the present invention is that the arbor eliminates any gap between the axial bearing surface of the arbor and the end wall of the hole cutter with fewer parts and a relatively simple and easy to use construction in comparison to prior art arbors.

As may be recognized by those of ordinary skill in the pertinent art based on the teachings herein, numerous changes and modifications may be made to the above-described and other embodiments of the present invention without departing from the invention as defined in the appended claims. For example, the components of the arbor may be formed of any of numerous different materials that are currently or later become known, and the arbors may be used with any of numerous different types of tools that are currently or later become known. Accordingly, this detailed description of the currently-preferred embodiments is to be taken in an illustrative, as opposed to a limiting sense.

What is claimed is:

1. An arbor for a hole cutter including an outer surface defining a threaded hole, and at least one pin hole spaced radially relative to the threaded hole, the arbor comprising:

an axially-elongated arbor body including a first threaded portion formed on an end portion of the arbor body and defining a major thread diameter that is threadedly engageable with the threaded hole of the hole cutter, a shoulder formed adjacent to the first threaded portion and spaced radially outwardly therefrom, a drive shank formed on another end portion of the arbor body, and at least one first bearing surface extending axially along a portion of the arbor body between the shoulder and drive shank;

a pin ring defining an aperture extending therethrough, an axial bearing surface formed on one side of the pin ring, at least one drive pin radially spaced relative to the aperture and extending axially from the axial bearing surface, and a second bearing surface forming at least a portion of a periphery of the aperture, wherein the arbor body is receivable within the aperture of the pin ring with at least one of the pin ring and arbor body being axially movable relative to the other, at least one of the first and second bearing surfaces is engageable with the other for preventing the pin ring and arbor body from rotating relative to each other, the at least one drive pin is receivable within the at least one pin hole of the hole cutter, at least one of the second and axial bearing surfaces is movable axially over the shoulder of the arbor body in a first direction, is engageable with the major diameter of the first threaded portion of the arbor body and is thereby prevented from further axial movement relative to the arbor body in the first direction, and the axial bearing surface of the pin ring is engageable with the hole cutter with the at least one drive pin received within the at least one corresponding pin hole; and a locking member engageable with the arbor body for releasably securing the axial bearing surface of the pin ring in engagement with the hole cutter.

2. An arbor as defined in claim 1, wherein the pin ring includes two drive pins diametrically spaced relative to each other on the axial bearing surface.

3. An arbor as defined in claim 1, further comprising a resilient member receivable on the arbor body between the locking member and pin ring to facilitate securing the locking member and pin ring to the hole cutter.

4. An arbor as defined in claim 1, wherein the pin ring defines a substantially circular periphery.

5. An arbor as defined in claim 3, wherein the resilient member defines an annular portion extending about a periphery of the arbor body.

6. An arbor for a hole cutter including an outer surface defining a threaded hole, and at least one pin hole spaced radially relative to the threaded hole, the arbor comprising:

an axially-elongated arbor body including a first threaded portion formed on an end portion of the arbor body and defining a major thread diameter that is threadedly engageable with the threaded hole of the hole cutter, a shoulder formed adjacent to the first threaded portion and spaced radially outwardly therefrom, a drive shank formed on another end portion of the arbor body, and at least one first bearing surface extending axially along a portion of the arbor body between the shoulder and drive shank;

a pin ring defining an aperture extending therethrough, an axial bearing surface formed on one side of the pin ring, at least one drive pin radially spaced relative to the aperture and extending axially from the axial bearing surface, and a second bearing surface forming at least a portion of a periphery of the aperture, wherein the arbor body is receivable within the aperture of the pin ring with at least one of the pin ring and arbor body being axially movable relative to the other, at least one of the first and second bearing surfaces is engageable with the other for preventing the pin ring and arbor body from rotating relative to each other, the at least one drive pin is receivable within the at least one pin hole of the hole cutter, at least one of the second and axial bearing surfaces is movable axially over the shoulder of the arbor body and is engageable with the major diameter of the first threaded portion of the arbor body, and the axial bearing surface of the pin ring is engageable with the hole cutter with the at least one drive pin received within the at least one corresponding pin hole;

a locking member engageable with the arbor body for releasably securing the axial bearing surface of the pin ring in engagement with the hole cutter; and an o-ring receivable on the arbor body between the locking member and pin ring to facilitate securing the locking member and pin ring to the hole cutter.

7. An arbor as defined in claim 1, wherein the arbor body includes two first bearing surfaces, the pin ring includes two second bearing surfaces, and each second bearing surface is slidable with respect to a respective first bearing surface for preventing relative rotation of the arbor body and pin ring.

8. An arbor body as defined in claim 7, wherein the aperture of the pin ring defines an approximately double "D" shape.

9. An arbor for a hole cutter including an outer surface defining a threaded hole, and at least one pin hole spaced radially relative to the threaded hole, the arbor comprising:

an axially-elongated arbor body including a first threaded portion formed on an end portion of the arbor body and defining a major thread diameter that is threadedly engageable with the threaded hole of the hole cutter, a shoulder formed adjacent to the first threaded portion and spaced radially outwardly therefrom a drive shank formed on another end portion of the arbor body, and at least one first bearing surface extending axially along a portion of the arbor body between the shoulder and drive shank;

a pin ring defining an aperture extending therethrough, an axial bearing surface formed on one side of the pin ring, at least one drive pin radially spaced relative to the aperture and extending axially from the axial bearing surface, and a second bearing surface forming at least a portion of a periphery of the aperture, wherein the arbor body is receivable within the aperture of the pin ma with at least one of the pin ring and arbor body being axially movable relative to the other, at least one of the first and second bearing surfaces is engageable with the other for preventing the pin ring and arbor body from rotating relative to each other, the at least one drive pin is receivable within the at least one pin hole of the hole cutter, at least one of the second and axial bearing surfaces is movable axially over the shoulder of the arbor body and is engageable with the major diameter of the first threaded portion of the arbor body, and the axial bearing surface of the pin ring is engageable with the hole cutter with the at least one drive pin received within the at least one corresponding pin hole; and a locking member engageable with the arbor body for releasably securing the axial bearing surface of the pin ring in engagement with the hole cutter, wherein the second bearing surface defines a chamfered portion engageable with the first threaded portion of the arbor body.

10. An arbor as defined in claim 1, further comprising a retaining clip connectable to the arbor body for engaging the locking member and preventing further axial movement thereof.

11. An arbor as defined in claim 1, wherein the arbor body further defines a pilot drill aperture spaced radially inwardly relative to the first threaded portion of the arbor body for receiving a pilot drill, and a fastener aperture extending radially through a side wall of the arbor body, and wherein the arbor further includes a fastener receivable within the fastener aperture and engageable with a pilot drill received within the pilot drill aperture for fixedly securing a pilot drill to the arbor body, and the pin ring is axially movable relative to the fastener received within the fastener aperture.

12. An arbor as defined in claim 1, wherein the hole cutter is a hole saw.

13. An arbor as defined in claim 1, wherein the axial bearing surface of the pin ring abuttingly engages the outer surface of the hole cutter with the at least one drive pin received within the at least one corresponding pin hole.

14. An arbor as defined in claim 1, wherein the locking member is a nut.

15. An arbor as defined in claim 1, wherein the arbor body defines a second threaded portion axially spaced on another side of the shoulder relative to the first threaded portion, and the locking member is threadedly engageable with the second threaded portion of the arbor body.

16. A system comprising an arbor as defined in claim 1, and a plurality of hole cutters, wherein each hole cutter includes an outer surface defining a threaded hole, and at least one pin hole spaced radially relative to the threaded hole.

17. An arbor for a hole cutter including an outer surface defining a threaded hole, and at least one pin hole spaced radially relative to the threaded hole, the arbor comprising:
an arbor body including a threaded end portion threadedly engageable with the threaded hole of the hole cutter, a stop surface formed adjacent to the threaded end portion and spaced radially outwardly therefrom, a drive shank located on another end portion of the arbor body, and a first bearing surface extending axially along a portion of the arbor body between the stop surface and drive shank;
a pin support member including an aperture formed therethrough, a second bearing surface formed on one side thereof, at least one pin extending outwardly of the second bearing surface, and a third bearing surface formed adjacent to the aperture, wherein the arbor body is receivable within the aperture of the pin support member with at least one of the pin support member and arbor body being axially movable relative to the other, at least one of the first and third bearing surfaces is engageable with the other for preventing relative rotation of the pin support member and arbor body, the at least one pin is receivable within the at least one pin hole of the hole cutter, at least one of the second and third bearing surfaces is movable axially over the stop surface of the arbor body in a first direction, is engageable with a peripheral surface of the threaded end portion of the arbor body and is thereby prevented from further axial movement relative to the arbor body in the first direction, and the second bearing surface of the pin support member is abuttingly engageable with the hole cutter with the at least one pin received within the at least one corresponding pin hole of the hole cutter; and
a locking member coupled to the arbor body for releasably securing the pin support member to the hole saw.

18. An arbor as defined in claim 17, wherein the pin support member includes two pins spaced relative to each other on the second bearing surface.

19. An arbor as defined in claim 17, further comprising a resilient member receivable on the arbor body between the locking member and pin support member.

20. An arbor as defined in claim 17, wherein the pin support member is substantially ring shaped.

21. An arbor as defined in claim 17, wherein the arbor body includes two first bearing surfaces, the pin support member includes two third bearing surfaces, and each third bearing surface is slidably engageable with a respective first bearing surface for preventing relative rotation of the arbor body and pin support member.

22. An arbor for a hole cutter including an outer surface defining a threaded hole, and at least one pin hole spaced radially relative to the threaded hole, the arbor comprising:
an arbor body including a threaded end portion threadedly engageable with the threaded hole of the hole cutter, a stop surface formed adjacent to the threaded end portion and spaced radially outwardly therefrom, a drive shank located on another end portion of the arber body, and a first bearing surface extending axially along a portion of the arbor body between the stop surface and drive shank;
a pin support member including an aperture formed therethrough, a second bearing surface formed on one side thereof, at least one pin extending outwardly of the second bearing surface, and a third bearing surface formed adjacent to the aperture, wherein the arbor body is receivable within the aperture of the pin support member with at least one of the pin support member and arbor body being axially movable relative to the other, at least one of the first and third bearing surfaces is engageable with the other for preventing relative rotation of the pin support member and arbor body, the at least one pin is receivable within the at least one pin hole of the hole cutter, at least one of the second and third bearing surfaces is movable axially over the stop surface of the arbor body and is engageable with a peripheral surface of the threaded end portion of the arbor body, and the second bearing surface of the pin support member is abuttingly engageable with the hole cutter with the at least one pin received within the at least one corresponding pin hole of the hole cutter; and
a locking member coupled to the arbor body for releasably securing the pin support member to the hole saw, wherein the third bearing surface defines a chamfered portion engageable with the threaded end portion of the arbor body.

23. An arbor for a hole cutter including an outer surface defining a threaded hole, and at least one drive surface hole spaced radially relative to the threaded hole, the arbor comprising:
an arbor body including first means for threadedly engaging the threaded hole of the hole cutter; second means for stopping further axial movement of the hole cutter relative to the arbor body upon threadedly engaging the first means to the hole cutter; and third means for connecting the arbor to a power tool for rotatably driving the arbor and hole cutter connected thereto;
a drive member connectable between the arbor body and hole cutter; the drive member including an aperture formed therethrough for receiving the arbor body and allowing axial movement of at least one of the drive member and arbor body relative to the other; fourth means for preventing relative rotation of the arbor body and drive member, wherein the fourth means is movable axially over the second means in a first direction, is engageable with the first means of the arbor body and is thereby prevented from further axial movement relative to the arbor body in the first direction; at least one drive surface extending outwardly of the drive member and receivable within the at least one drive surface hole of the hole cutter; and fifth means for abuttingly engaging the hole cutter with the at least one drive surface received within the at least one corresponding drive surface hole of the hole cutter; and a locking member coupled to the arbor body for releasably securing the drive member to the hole cutter.

24. An arbor as defined in claim 23, wherein the first means is a threaded end portion of the arbor body.

25. An arbor as defined in claim 23, wherein the second means is a shoulder formed on the arbor body adjacent to the first means and spaced radially outwardly therefrom.

26. An arbor as defined in claim 23, wherein the third means is a drive shank.

27. An arbor as defined in claim 23, wherein the fourth means is a bearing surface of the drive member defining at least a portion of a periphery of the aperture formed through the drive member.

28. An arbor as defined in claim 23, wherein the fifth means is an axial bearing surface of the drive member formed on one side of the drive member with the at least one drive surface extending axially therefrom.

29. A system comprising an arbor as defined in claim 23, and a plurality of hole cutters, wherein each hole cutter includes an outer surface defining a threaded hole, and at least one drive surface hole spaced radially relative to the threaded hole.

30. A method for attaching an arbor to a hole cutter, wherein the hole cutter comprises an outer surface defining a threaded hole; and at least one drive pin hole spaced radially relative to the threaded hole; and the arbor comprises an arbor body including a threaded end portion, and a stop surface formed adjacent to the threaded end portion and spaced radially outwardly therefrom; a pin support member including an aperture formed therethrough, a second bearing surface formed on one side thereof, at least one pin extending through and outwardly of the second bearing surface, wherein a portion of the second bearing surface is contiguous to the at least one pin, and a third bearing surface formed adjacent to the aperture, wherein at least one of the second and third bearing surfaces is axially movable over the stop surface of the arbor body and engageable with the threaded end portion thereof and a locking member coupled to the arbor body; the method comprising the following steps:

threadedly connecting the end portion of the arbor body to the threaded hole of the hole cutter until the hole cutter contacts the stop surface of the arbor body;

unthreading the end portion of the arbor body from the threaded hole of the hole cutter and aligning the at least one pin of the pin support member with the at least one corresponding pin hole of the hole cutter;

moving the pin support member and the at least one pin extending through and outwardly of the second bearing surface thereof axially over the arbor body and toward the hole cutter until the at least one pin is received within the at least one corresponding pin hole of the hole cutter and the second bearing surface including the portion of the second bearing surface contiguous to the at least one pin abuttingly engages the hole cutter; and moving the locking member axially over the arbor body and toward the pin support member and releasably securing with the locking member the second bearing surface of the pin support member including the portion of the second bearing surface contiguous to the at least one pin in abutting engagement with the hole cutter.

31. A method as defined in claim 30, further comprising the steps of providing a resilient member located on the arbor body and pin support member, and manually threading the locking member against the resilient member and pin support member to releasably secure the pin support member in abutting engagement with the hole cutter.

32. A method as defined in claim 30, wherein the step of moving the pin support member axially over the arbor body and toward the hole cutter includes moving the second bearing surface axially over the stop surface of the arbor body until the at least one pin of the pin support member is received within the at least one corresponding pin hole of the hole cutter and the second bearing surface abuttingly engages the hole cutter.

* * * * *